United States Patent [19]

Rasor et al.

[11] Patent Number: 4,501,386
[45] Date of Patent: Feb. 26, 1985

[54] LUGGAGE RACK WITH PRE-ATTACHED END PIECE

[75] Inventors: William Rasor, Marysville; Leon E. Redman, Bloomfield Hills, both of Mich.

[73] Assignee: Masco Corporation, Taylor, Mich.

[21] Appl. No.: 537,105

[22] Filed: Sep. 29, 1983

[51] Int. Cl.³ .............................................. B60R 9/00
[52] U.S. Cl. .............................................. 224/326
[58] Field of Search ............... 224/309, 326, 917, 324, 224/325, 327

[56] References Cited

U.S. PATENT DOCUMENTS

| 4,015,760 | 4/1977 | Bott | 224/326 |
| 4,099,658 | 7/1978 | Bott | 224/326 |
| 4,170,322 | 10/1979 | Bott | 224/326 |
| 4,343,419 | 8/1982 | Mareydt | 224/326 |

Primary Examiner—Stephen Marcus
Assistant Examiner—David Voorhees
Attorney, Agent, or Firm—Steven L. Permut; Malcolm L. Sutherland; Leon E. Redman

[57] ABSTRACT

An article carrier has two side rails with a stanchion connected to each rail. Between the two side rails and extending parallel thereto are a plurality of slat assemblies 18 and a support slat assembly 20. Each assembly 18 and 20 includes a slat member and an end cap member 21. The end cap member 21 is attached to the slat member via a first fastener 50. The end cap member is attached to a vehicle surface via a second fastener 52. The combination and support tie ring member of a support slat assembly has an upwardly extending section which abuts the underside of the cross rail.

11 Claims, 7 Drawing Figures

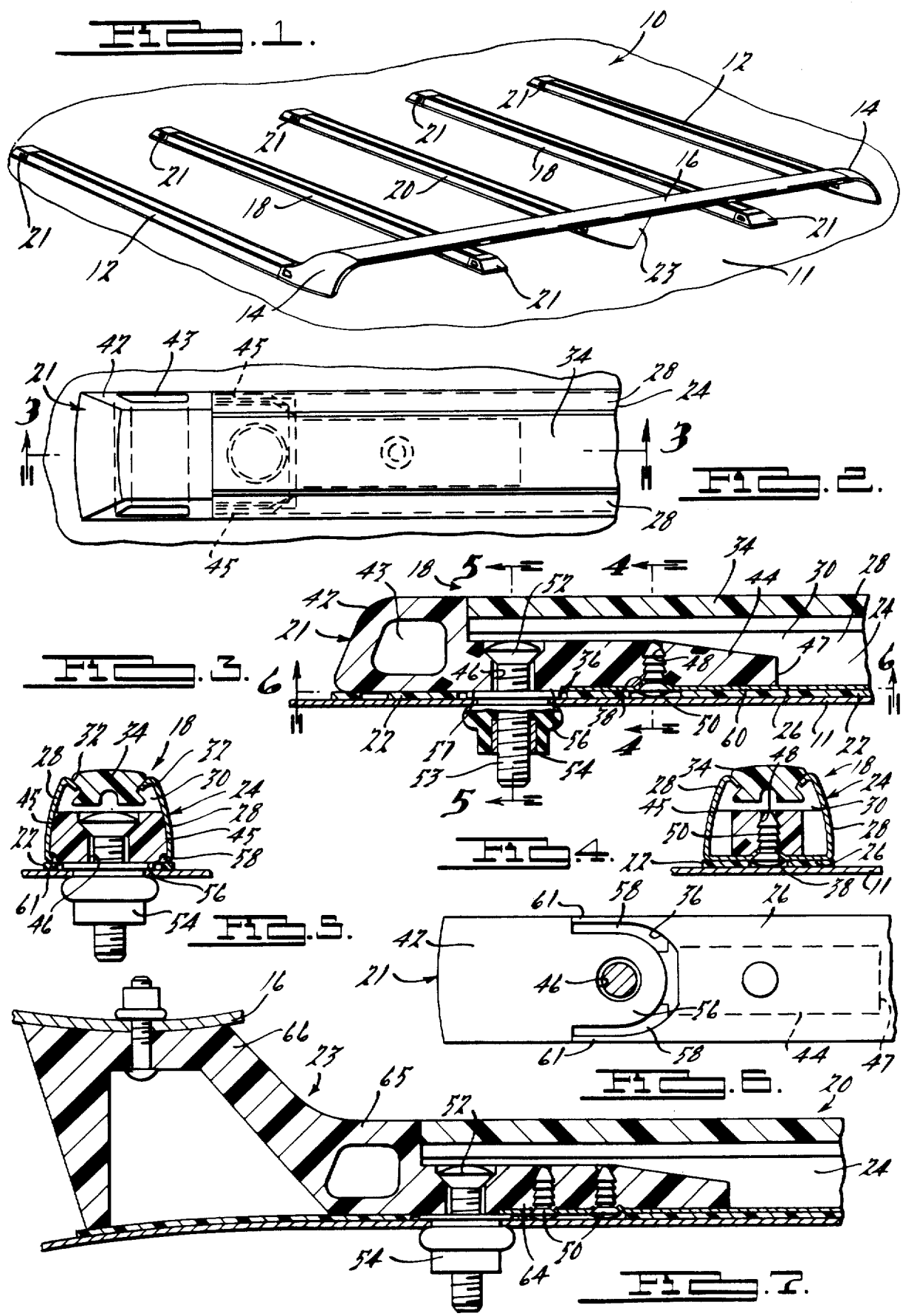

LUGGAGE RACK WITH PRE-ATTACHED END PIECE

BACKGROUND OF THE INVENTION

1. Technical Field

This invention relates to article carriers for automotive vehicles.

2. Disclosure Information

Automobile manufacturers desire to install article carriers on many of their new car models as an option. Article carriers installed at the assembly line include stanchions, slat members, tie ring members, and liners. The plurality of parts pose an inconvenience for the automobile manufacturers. Often, the manufacturer must handle all the separate members and then assemble them in a single operation. For example, see U.S. Pat. No. 4,170,322 issued to Bott on Oct. 7, 1979, and U.S. Pat. No. 4,343,419 issued to Mareydt on Aug. 10, 1982. In these two references, a single fastener attaches the end member and slat member to the vehicle surface.

In another type of luggage rack, the slat must be attached to the vehicle surface before the tie ring member is secured to the slat. See for example, U.S. Pat. No. 4,015,760 issued to Bott on Apr. 5, 1977.

What is needed is a luggage carrier that has slats with previously attached tie ring members wherein the tie ring and slat assembly can be easily mounted to the vehicle surface.

SUMMARY OF THE INVENTION

In accordance with the invention, an article carrier for an automotive vehicle includes an article supporting slat constructed to be mounted on the vehicle surface. The slat includes a base with two upwardly extending side walls. The side walls terminate above the base and are spaced apart to form a channel. An opening extends through the base proximate one end thereof. A unitary end cap member extends into the one end of the slat. Preferably, the unitary end cap is a tie ring member. The unitary end cap member has a first and second receiving portions. A first fastener passes through the first opening and engages the first receiving portion to fasten the end cap member to the slat. A second fastener engages the second receiving portion and secures the end cap member to the vehicle surface.

Preferably, the first fastener has a head portion positioned at the underside of the base and upwardly extends through the opening and into the first receiving portion of the end cap member.

Preferably, the side walls extend longitudinally beyond a section of the base to form a notch between the side walls. The second receiving portion of the end cap is aligned with the notch and the second fastener extends between the side walls in the notch to attach the end cap to the vehicle surface.

It is desirous to have the end cap having an embossed section extending down into the notch such that the lower surface of the end member is flushed with the lower surface of the base.

The end cap can therefore be attached to the slat member before attachment of the slat member and end piece assembly to the vehicle surface. In this fashion, the slat and end cap can be preassembled and shipped to an automobile factory as a unit with the end cap and slat assembly being connected to the vehicle surface in one easy operation. In addition, the two fasteners engaging the end cap prevent the end cap from being rotated and pivoted with respect to the slat and therefore minimizes any sideload forces against the walls of the slat which may otherwise outwardly bend the sidewalls of the slat and detract from its aesthetic appearance.

BRIEF DESCRIPTION OF THE DRAWINGS

Reference now will be made to the accompanying drawings in which:

FIG. 1 is a perspective view of an article carrier according to the present invention mounted on a vehicle surface;

FIG. 2 is an enlarged fragmentary top plan view of a slat member and the tie ring member shown in FIG. 1;

FIG. 3 is a cross-sectional side elevational view of the slat and tie ring member in FIG. 2;

FIG. 4 is a cross-sectional view taken along lines 4—4 in FIG. 3;

FIG. 5 is a cross-sectional view taken along lines 5—5 in FIG. 3;

FIG. 6 is a cross-sectional view taken along lines 6—6 in FIG. 3; and

FIG. 7 is an enlarged fragmentary side elevational and segmented view of a slat and combination tie ring and support member shown in FIG. 1;

DETAILED DESCRIPTION OF THE PREFERRED EMBODIMENT

Referring particularly to FIG. 1, an article carrier 10 includes two side rails 12 secured to a vehicle surface 11. Each side rail 12 has a combination tie ring and stanchion 14 secured at a rear end thereof. Cross rail 16 extends between the side rails 12 attached to the stanchions 14. Cross rail 16 can be in the shape of an air spoiler if so desired.

Article carrying slat assemblies 18 are connected to the vehicle surface 11 and run parallel and between the two side rails 12. In addition, a middle support slat assembly 20 also runs parallel to the side rails 12. The front end of each rail 12, slat assembly 18 and support slat assembly 20 has a tie ring member 21 attached thereto. The rear end of each slat assembly 18 also has a tie ring member 21 attached thereto. The front end of the middle support slat 20 has a combination tie ring and support member 23.

Referring now more particularly to FIGS. 2-6, each slat assembly 18 has a slat member 24 seated upon a plastic insulator liner 22. The slat member 24 has a base 26 and two upwardly converging side walls 28 which form an open channel 30 therebetween. The upper end of the side walls 28 have flanges 32 which accept a snap fitted rub strip 34. The base 26 has a notch 36 at an end thereof and an aperture 38 proximate the notch 36.

The tie ring member 21 is positioned at the end of the slat member 24. The tie ring member 21 has an eyelet section 42 with an eyelet 43 therethrough. The section 42 encloses the end of the slat member 24. A tongue section 44 intrudes into the channel 30. The tongue section 44 has two side walls 45 that are shaped to flushly abut the walls 28 of slat member 24. The tongue section 44 then narrows down toward its axial inner end 47. The tongue section has an aperture 46 and a hole 48 which are aligned with the notch 36 and aperture 38, respectively. A fastener 50 such as a mil-tite drive pin extends upwardly through the aperture 38 in slat member 24 and engages the hole 48 secure the slat member 24 to the tie ring member 21.

A second fastener 52 comprises a screw 53 and compressible rubber toggle 54 such as a Wel-Nut TM. The screw 53 extends through the aperture 46 and the notch 36 to engage the compressible rubber toggle that is set into the vehicle surface 11. The fastener 52 secures the tie ring member 21 to the vehicle surface 11. As is more clearly shown in FIGS. 3 and 5, the tie ring member 21 has a downwardly embossed section 56 which extends down into the notch 36 such that its lower surface 57 is aligned with the lower surface 60 of the base 26. The lower surface 57 abuts the upper surface of the toggle 54. In addition, a peripheral raised section 58 extends about the extending section 56 such that there is no contact between the raised section 58 and any flange 61 of the base 26 about notch 36.

Once the tie ring is in position, the complementary fit of the tongue walls 45 within channel 30 and the two fasteners 50 and 52 prevent pivotable motion of the tie ring member 21 with respect to the slat member 24. The side walls 28 therefore are not outwardly flexed which would destroy the aesthetic integrity of the slat.

The tie ring member 21 can be secured to the slat member 24 and then shipped as a unitary assembly 18. After shipment, the slat member 24 and end cap member 40 in a single assembly operation can be secured to the vehicle surface 11 by fastener 52. The rub strip 34 then is snap fitted in position closing channel 30 and concealing the fastener 52 and tongue section 44.

Referring now to FIG. 7, the support slat assembly 20 has the combination tie ring and support member 23 attached to a slat member 24 in a similar fashion as the tie ring member 21. A second mil-tite drive pin 50 further secures the member 23 to slat member 24. Member 62 has a tongue portion 64, and an eyelet section 65, similar to the first described embodiment. In addition an upright support section 66, integral with eyelet section 65, extends upwardly to the underside of cross rail 16. The fasteners 50 attach the tongue section 64 in the same fashion as described before such that the support 62 can be attached to the slat member 24 before shipment. The tie ring member 21 at the front end of slat assembly 20 is attached in the same fashion as previously described for slat assembly 18, to provide a unitary slat assembly before attachment of the slat assembly 20 to the vehicle surface 11.

In this fashion, an automotive article carrier is constructed with the tie ring member preassembled to the slat and the fastener for securing the tie ring to the slat and the fastener for securing the tie ring to the vehicle surface both being concealed within a covered channel by a rub strip.

Variations and modifications of the present invention are possible without departing from its spirit and scope as defined by the appended claims.

The embodiments in which an exclusive property and privilege is claimed are defined as follows:

1. An article carrier for an automotive vehicle, said article carrier comprising:
   an article supporting slat constructed to be mounted on a vehicle surface;
   said slat includes a base and two side walls extending upwardly from said base and terminating above said base and being spaced apart to form a channel between said side walls and above said base;
   said base having at a proximate one end thereof an opening;
   an end cap member extending into said one end of said slat and having first and second receiving portions;
   a first fastener passing through said opening of said base and engaging said first receiving portion to fasten said unitary end cap member to said slat; and
   a second fastener positioned between said side walls and engaging said second receiving portion for securing said end cap member to said vehicle surface.

2. An article carrier as defined in claim 1 wherein the first fastener has a head portion at the underside of said base and has an upwardly extending portion passing through said opening in said base and into said first receiving portion.

3. An article carrier as defined in claim 2 wherein said side walls extend longitudinally beyond at least a section of said base to form a notch between said side walls, said second receiving portion aligned with said notch and said second fastener extends downwardly through said notch.

4. An article carrier as defined in claim 3 wherein:
   said end cap member has a lower embossed section about said second receiving portion, said embossed section extending into said notch such that the underside of said base and the lower surface of said embossed section are aligned.

5. An article carrier as defined in claim 4 wherein:
   said end cap member has a raised shoulder section about said lower embossed section with said raised shoulder section being spaced vertically above the base of said slat.

6. An article carrier as defined in claim 5 wherein:
   said end cap member has an eyelet section with an eyelet passing therethrough;
   said eyelet section closing an end of said channel.

7. An article carrier as defined in claim 6 wherein:
   said end cap member further comprises a support section upwardly extending from said eyelet section for supporting a cross rail.

8. An article carrier as defined in claim 3 wherein:
   said end cap member has a lower embossed section about said second receiving station, said embossed section extending into said notch such that it abuts a fixed surface positioned thereunder.

9. An article carrier as defined in claim 1 wherein:
   said end cap member has an eyelet section with an eyelet passing therethrough;
   said eyelet section closing an end of said channel.

10. An article carrier as defined in claim 1 wherein the first fastener has a head portion at the underside of said base and has an upwardly extending portion passing through said opening in said base and into said first receiving portion.

11. An article carrier for an automotive vehicle, said article carrier comprising:
    an article supporting slat constructed to be mounted on a vehicle surface;
    said slat includes a base and two side walls extending upwardly from said base and terminating above said base and being spaced apart to form a channel between said side walls and above said base;
    said base having at a proximate one end thereof an opening;
    an end cap member extending into said one end of said slat and having first and second receiving portions;
    a first fastener passing through said opening in said base and engaging said first receiving portion to fasten said end cap member to said slat; and
    a second fastener positioned between said side walls and engaging said second receiving portion for securing said end cap member to said vehicle surface.

* * * * *